US012285772B2

(12) United States Patent
Rossignol

(10) Patent No.: US 12,285,772 B2
(45) Date of Patent: Apr. 29, 2025

(54) FOAM DISPENSING SYSTEM HAVING MULTIPLE VALVES FOR A DISPENSER, AND ASSOCIATED FOAM DISPENSER

(71) Applicant: Silgan Dispensing Systems Le Treport S.A.S., Le Treport (FR)

(72) Inventor: Eric Rossignol, Chalon sur Saone (FR)

(73) Assignee: Silgan Dispensing Systems Le Treport S.A.S., Le Treport (FR)

( * ) Notice: Subject to any disclaimer, the term of this patent is extended or adjusted under 35 U.S.C. 154(b) by 283 days.

(21) Appl. No.: 17/762,067

(22) PCT Filed: Sep. 10, 2020

(86) PCT No.: PCT/EP2020/075274

§ 371 (c)(1),
(2) Date: Mar. 20, 2022

(87) PCT Pub. No.: WO2021/058284

PCT Pub. Date: Apr. 1, 2021

(65) Prior Publication Data

US 2022/0371037 A1 Nov. 24, 2022

(30) Foreign Application Priority Data

Sep. 23, 2019 (FR) .................................. FR1910470
Sep. 23, 2019 (FR) .................................. FR1910471
Sep. 23, 2019 (FR) .................................. FR1910472

(51) Int. Cl.
*B05B 11/00* (2023.01)
*B05B 11/10* (2023.01)

(52) U.S. Cl.
CPC ...... *B05B 11/1087* (2023.01); *B05B 11/1047* (2023.01)

(58) Field of Classification Search
CPC ............. B05B 11/1087; B05B 11/1047; B05B 11/1033; B05B 7/0037; B05B 11/1004; B05B 11/00442; B05B 11/1028
See application file for complete search history.

(56) References Cited

U.S. PATENT DOCUMENTS 4,179,049 A * 12/1979 Umstead ............. B05B 11/1087 222/321.9
2002/0056730 A1* 5/2002 van de Heijden .... B05B 11/105 222/145.5

(Continued)

FOREIGN PATENT DOCUMENTS

EP 1199105 A1 4/2002
EP 3210672 A1 8/2017

*Primary Examiner* — Donnell A Long
(74) *Attorney, Agent, or Firm* — Hinckley Allen & Snyder; Stephen Holmes

(57) ABSTRACT

The invention proposes a foam dispensing system for a dispenser comprising a reservoir storing cosmetic product, said system comprising a product pump and an air pump, said product pump comprising a variable volume product metering chamber (13) defined at least partly by a deformable element (2), said system comprising at least five valves referred to as a product inlet valve for the product to enter toward the product metering chamber (13), a product outlet valve for the product to exit from the product metering chamber (13), an air inlet valve for the air to enter in an air metering chamber (14) of the air pump, an air outlet valve for the air to exit from the air metering chamber (14), an air return valve for the recovery of the air of the reservoir. The deformable element (2) comprises at least four flaps which are movable between a valve open state and a valve closed state.

20 Claims, 9 Drawing Sheets

(56) References Cited

U.S. PATENT DOCUMENTS

| | | | | |
|---|---|---|---|---|
| 2012/0091229 | A1 | 4/2012 | Laidler et al. | |
| 2017/0246648 | A1* | 8/2017 | Rossignol | A45D 34/00 |
| 2017/0266680 | A1* | 9/2017 | Ophardt | F04B 45/04 |

* cited by examiner

[Fig.1]
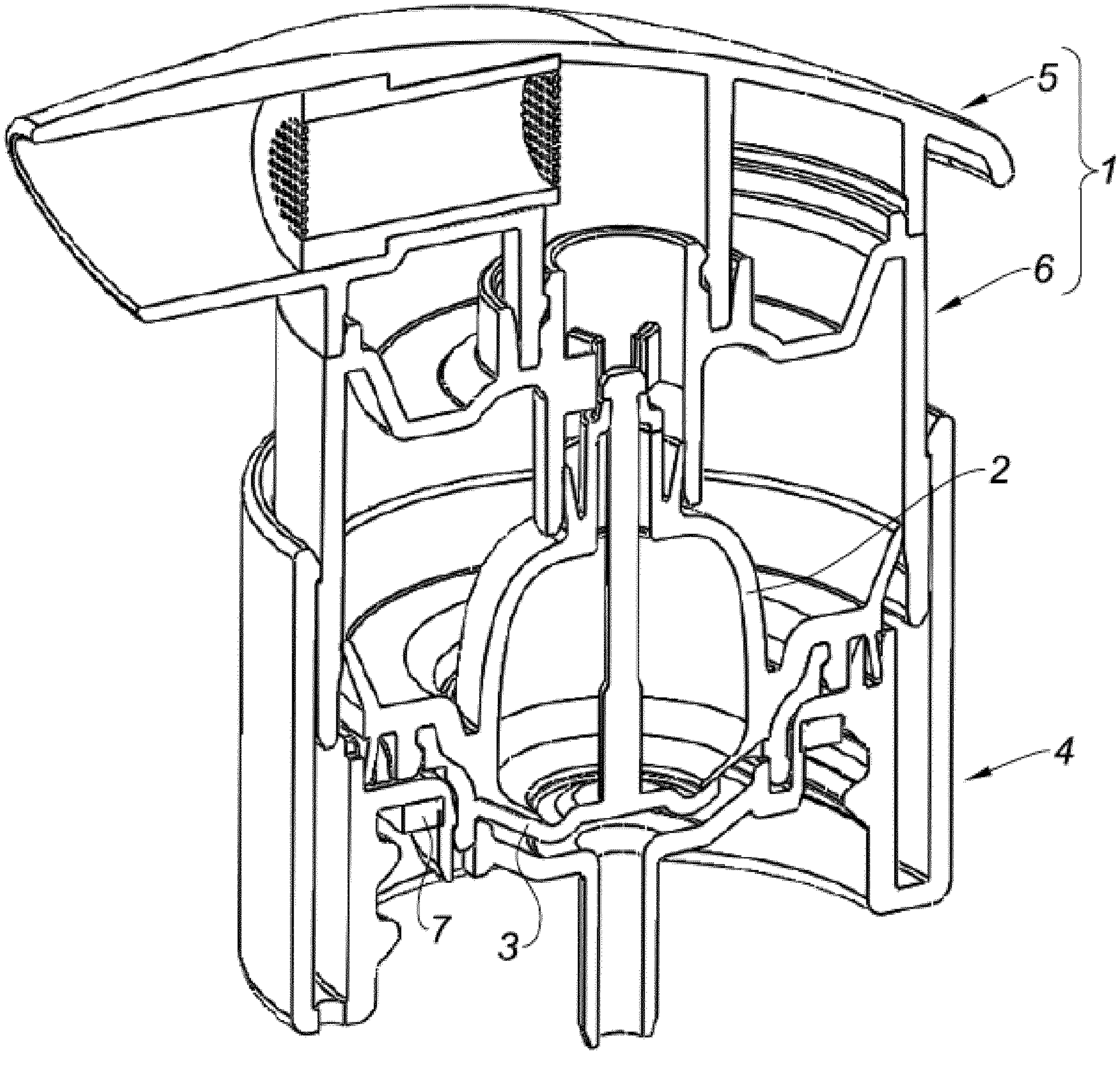

[Fig.2]
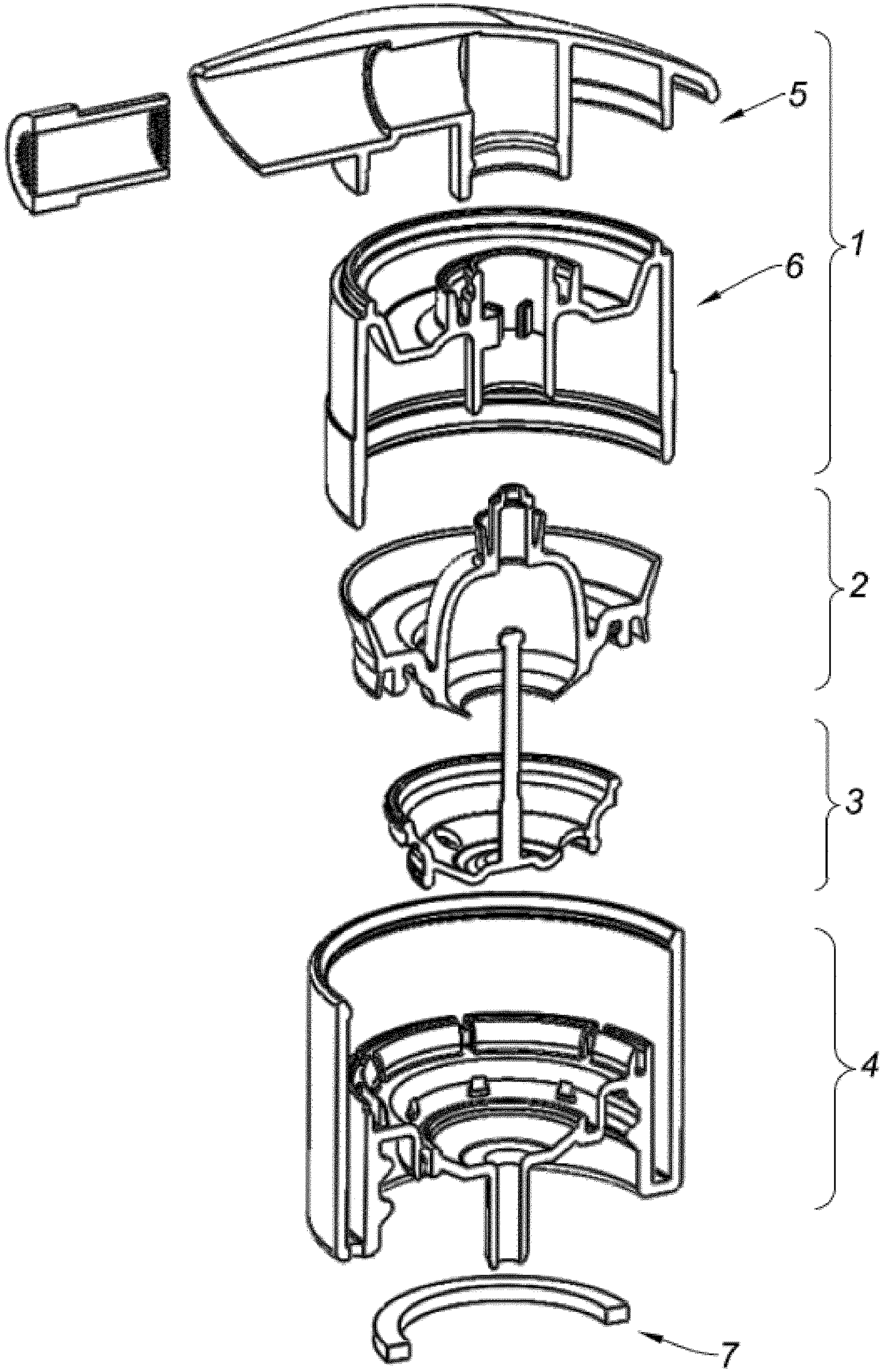

[Fig.3]
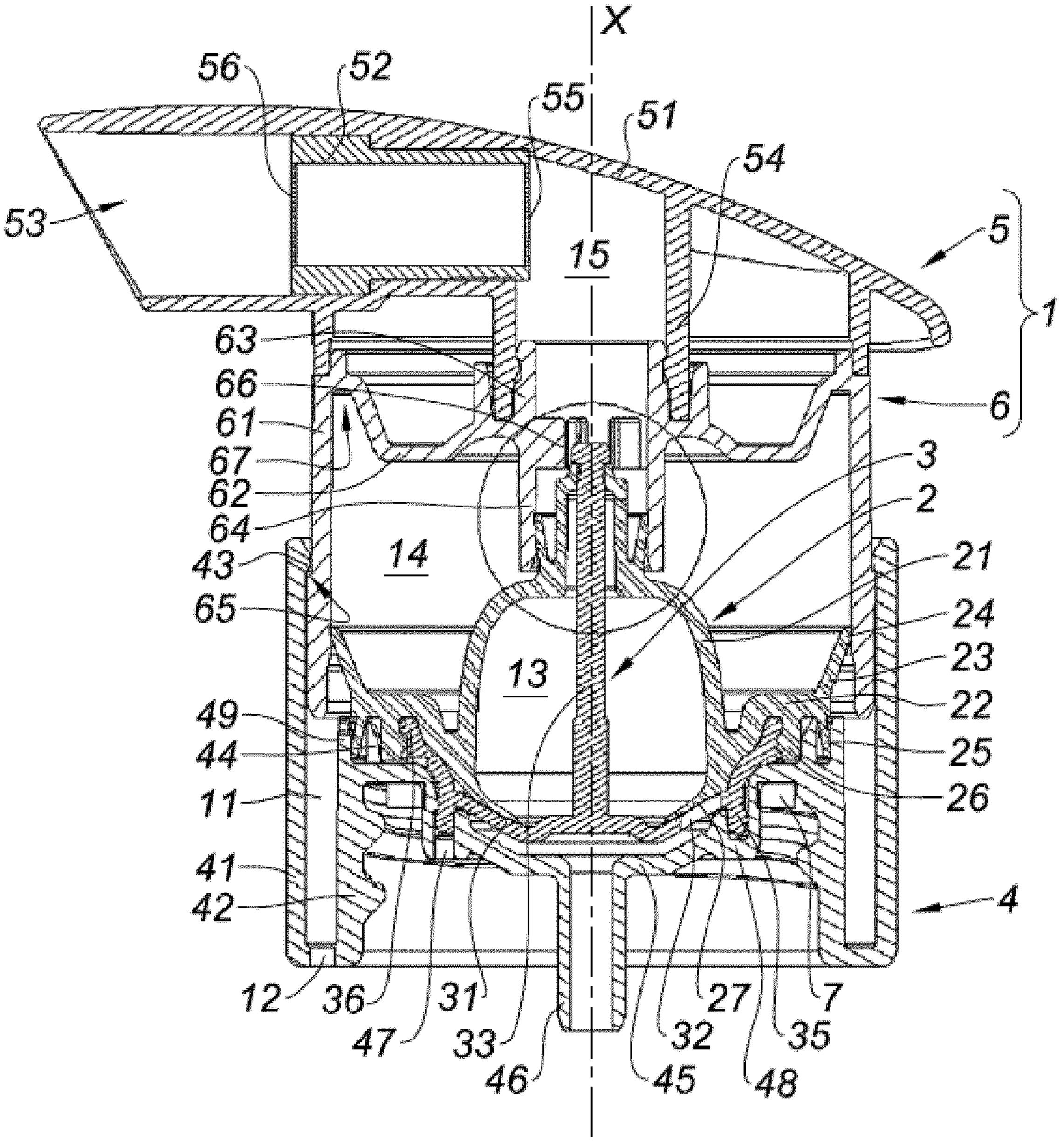

[Fig.4]
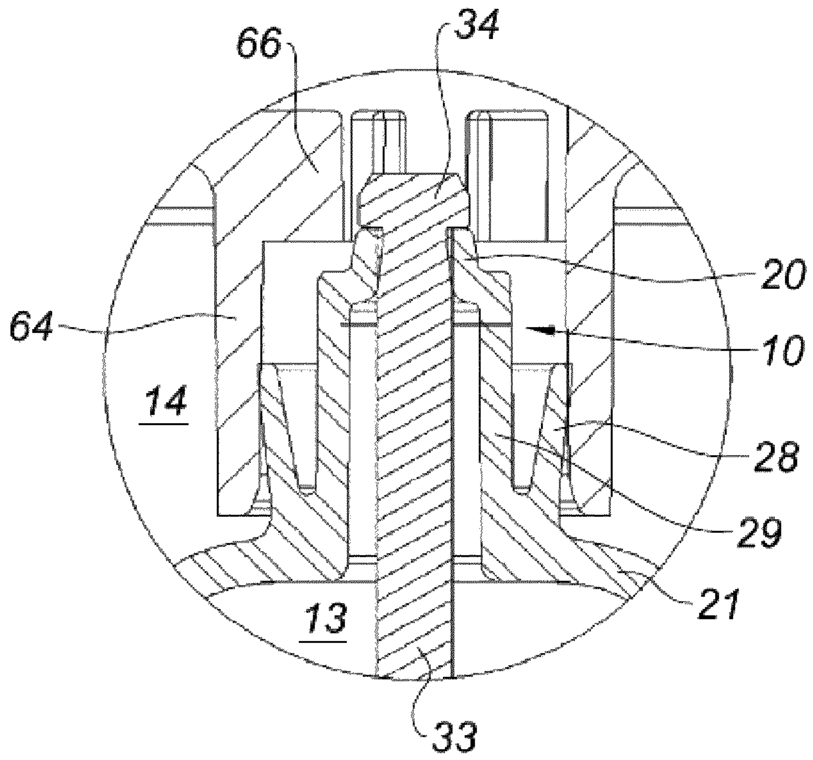

[Fig.5]
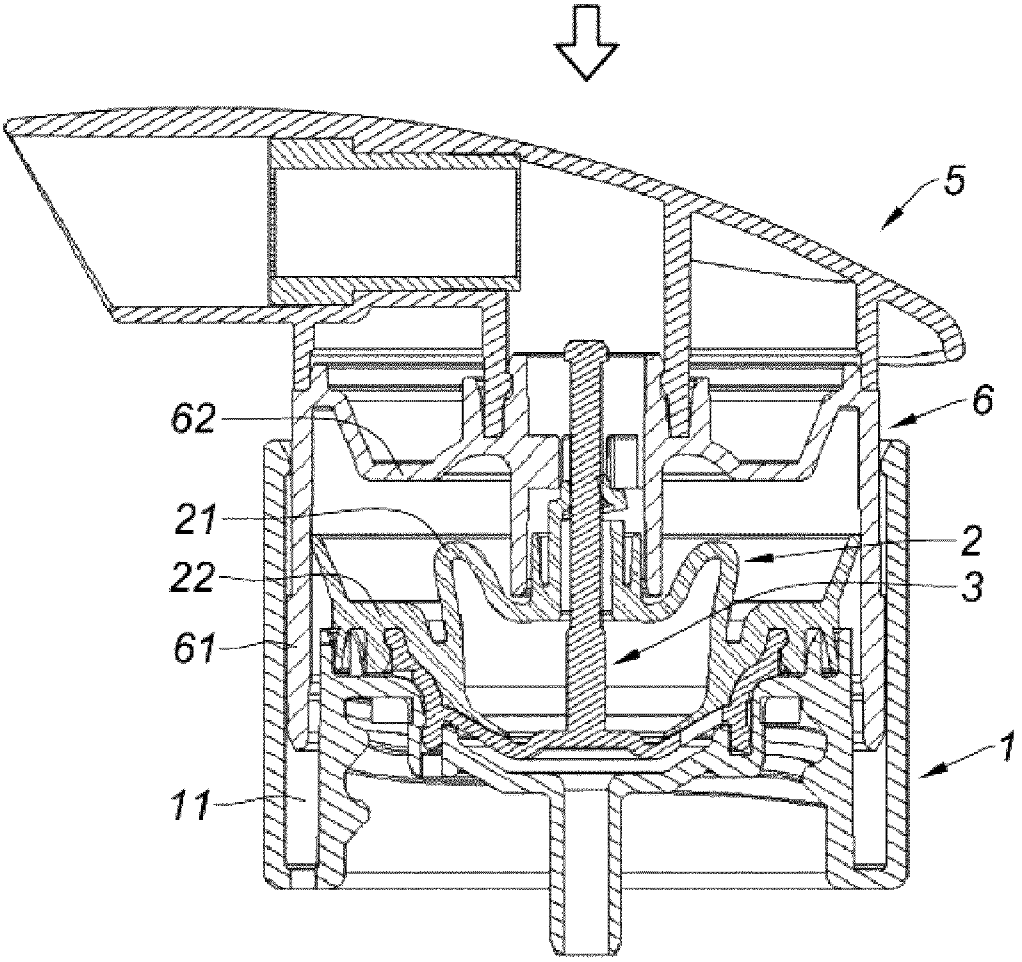

[Fig.6]
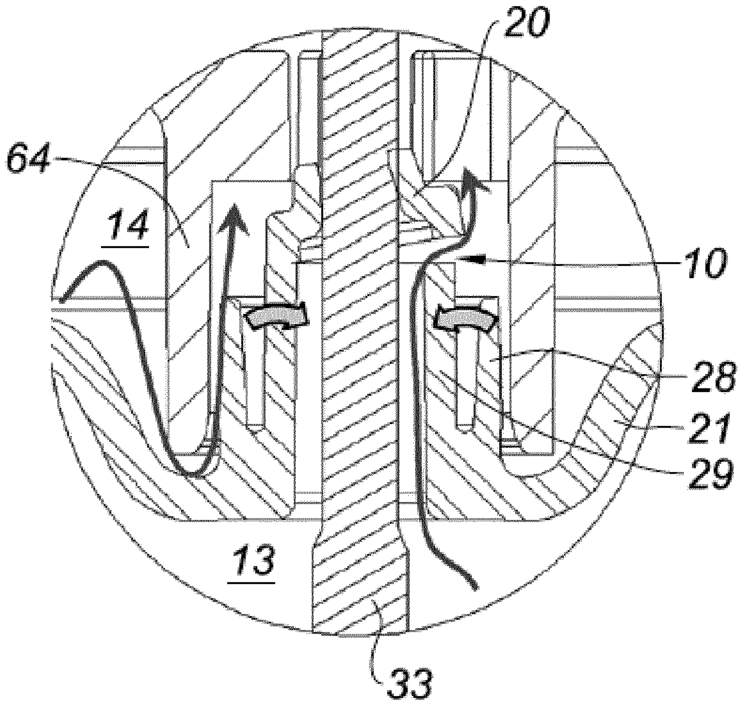

[Fig.7]
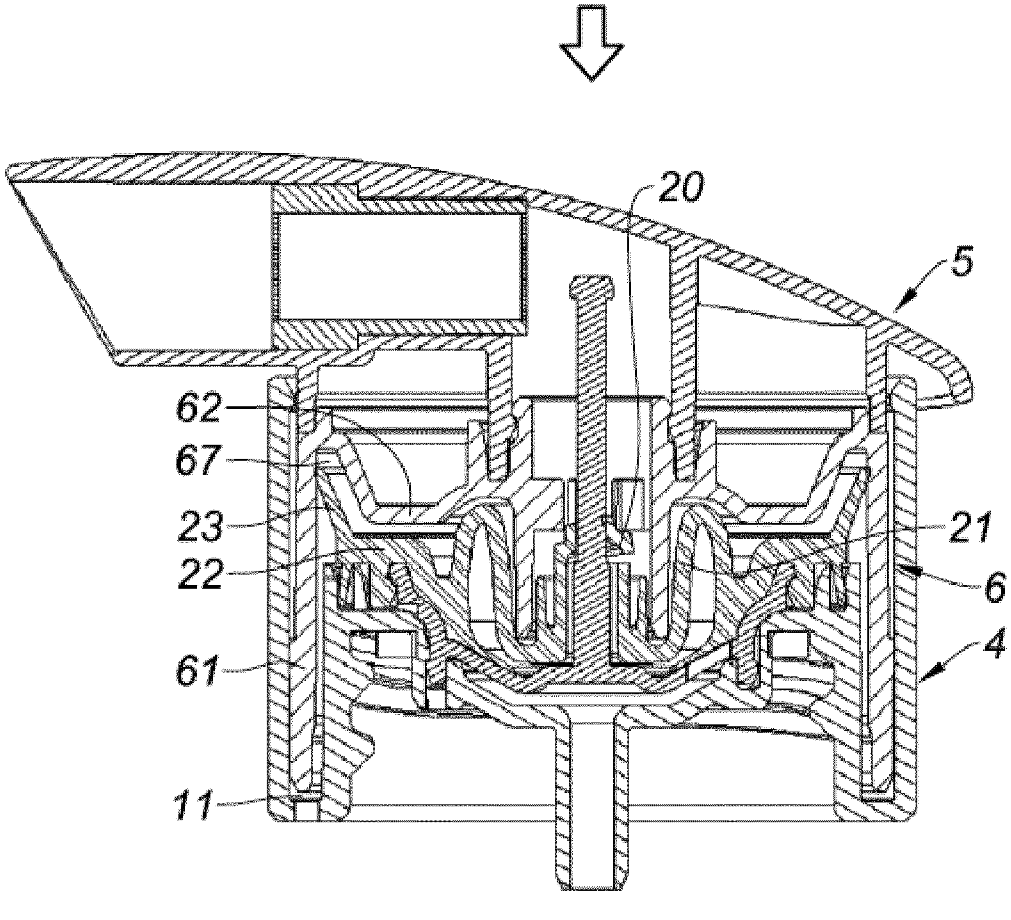

[Fig.8]
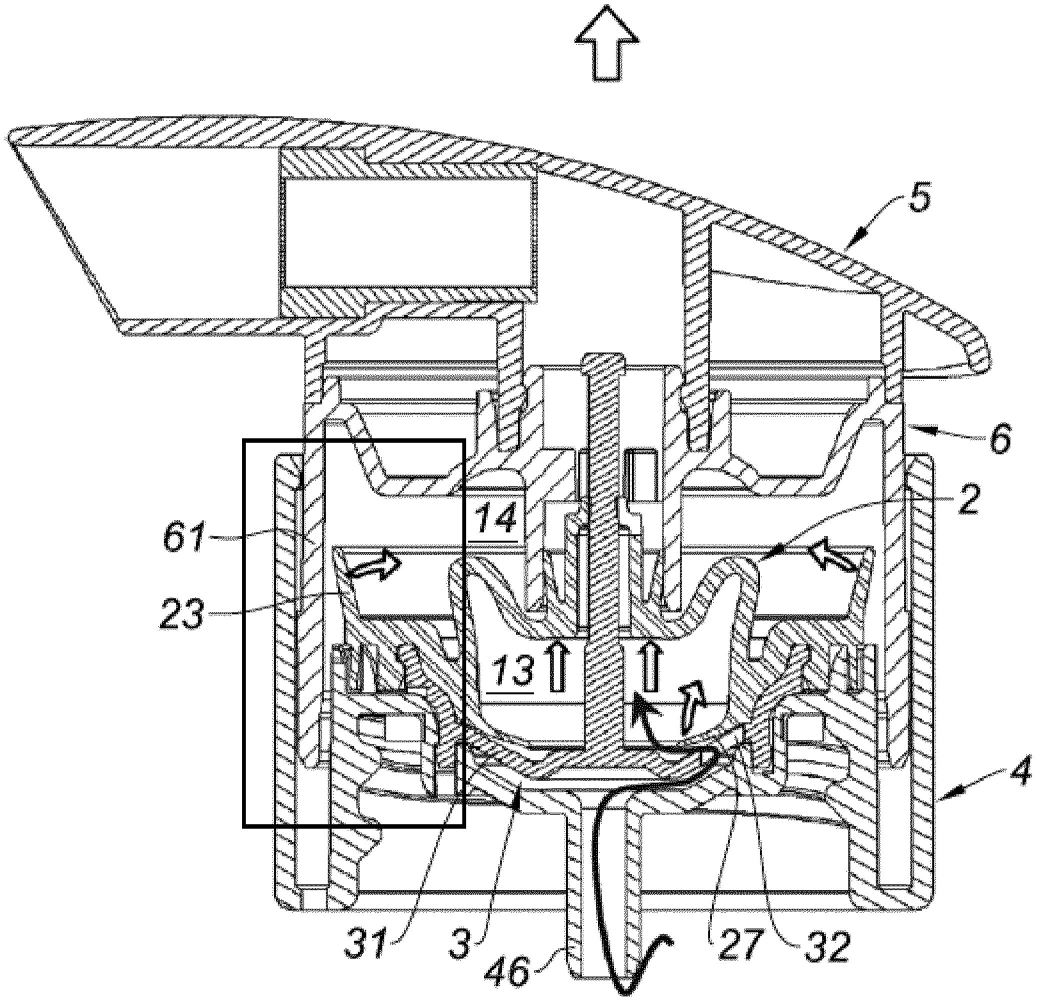

[Fig.9]
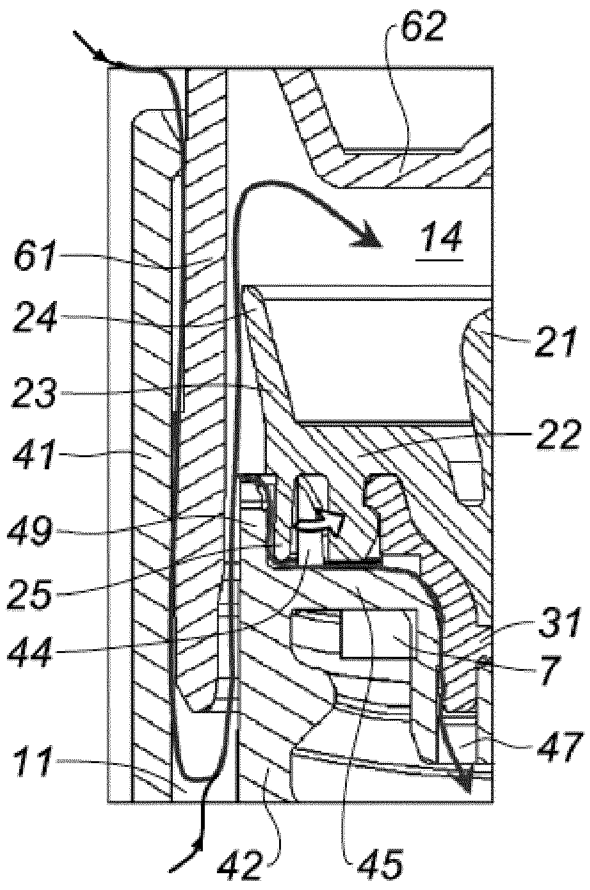

FOAM DISPENSING SYSTEM HAVING MULTIPLE VALVES FOR A DISPENSER, AND ASSOCIATED FOAM DISPENSER

TECHNICAL FIELD OF THE INVENTION

The invention relates to a foam dispensing system for a foaming product dispenser, in particular a cosmetic foaming product.

This dispensing system comprises an air pump and a product pump, with multiple valves, namely an air inlet valve, an air outlet valve, an air return valve, a product inlet valve and a product outlet valve. The invention also relates to a foam dispenser comprising such a dispensing system.

The foam dispensers comprise two pumps, an air pump and a product pump. The mixture of air and product allows to produce a foam at the outlet of the dispenser.

The product pump is configured to suck the cosmetic product contained in a reservoir of the dispenser, while the air pump is configured to suck the air from outside. The mixture of air and product is then distributed, for example by means of a nozzle or through a simple opening. The foaming product can thus be extracted or sprayed from the device to allow its application.

The pumps are often operated by means of a push button that is pressed by the user to initiate the operation of the pumps.

In particular, each pump comprises a metering chamber whose volume varies to allow the product or the air to be sucked into the chamber through an inlet orifice when the volume increases, and then expelled out of the chamber through an outlet orifice when the volume of the chamber decreases. The product and the air exit their respective chambers into a common conduit that leads to the opening or the nozzle usually arranged on the push button.

BACKGROUND

Fluid products dispensers comprising elastic membrane product pumps are known, with a rod passing through the membrane at the level of an elastic annular lip extending from the membrane. This annular lip in contact with the rod forms an outlet flap for the pump. In the rest position, the push button is held in the upper stop position under the effect of the elasticity of the membrane, and the annular lip is in contact with the rod and ensures a tight closure of the outlet flap. When the button is pressed, the volume of the metering chamber of the pump decreases, causing the pressure of the fluid product within the chamber to increase. The outlet flap opens by deformation of the elastic lip and the product is dispensed. At the end of dispensing, when the elastic membrane returns to the pre-stressed position, a depression is formed within the chamber, causing the suction of product from the reservoir into the chamber, via a product inlet flap, formed in part by an inlet lip also extending from the membrane.

This type of pump operates well for airless pumps, i.e. without air return. But it can also operate for pumps with air return. In this case, the device comprises an air return flap, allowing air to be introduced into the reservoir after a dose of product has been delivered, to make up for the reduction in the amount of product within the reservoir. This air return flap can be formed in part by an air return lip belonging to the membrane.

In practice, the membrane pumps are intended for dispensing a liquid fluid product, such as lotion or perfume. These membrane pumps are not intended for dispensing foam, as an air supply is required for the formation of the foam. And this air supply is usually formed by an additional piston pump, independent of the product pump and therefore of the membrane. The existence of two pumps (for the product and for the air) in a foam dispensing device leads to an increase in the overall dimension of the device, an increase in the number of parts of the device, and therefore an increase in the manufacturing time of the device.

SUMMARY

The present invention is intended to overcome the various disadvantages set forth above, by means of a foam dispensing system which integrates an air pump and a product pump while being compact, with a minimum of parts constituting the pumps, and of simple construction.

This is achieved by a foam dispensing system for a dispenser comprising a reservoir storing cosmetic product, the foam being derived from a mixture between said product and air, said system comprising a product pump and an air pump, said product pump comprising a variable volume product metering chamber defined at least partly by a deformable element, the product pump operating by varying the volume of the product metering chamber by elastically deforming a membrane of the deformable element between an initial state where the volume is maximum and a deformed state where the volume is minimum, said system comprising at least five valves referred to as a product inlet valve for the product to enter toward the product metering chamber, an product outlet valve for the product to exit from the product metering chamber, an air inlet valve for the air to enter in an air metering chamber of the air pump, an air outlet valve for the air to exit from the air metering chamber, and an air return valve for the recovery of the air of the reservoir.

The main characteristic of this system is that the deformable element comprises at least four flaps which are movable between a valve open state and a valve closed state.

A valve typically consists of a flap and a seat, with the flap closing the valve by resting on the seat. Thus, the dispensing system comprises the five valves, i.e. it comprises the five flaps and the five corresponding seats. The reservoir is not included in this dispensing system. The reservoir is thus independent of the five valves.

This ensures that an optimum seal is achieved at the level of each valve.

There are prior arts describing embodiments in which the valve is shared between the dispensing system and the reservoir, for example, the flap of the valve belongs to the dispensing system and the neck of the bottle serves as the valve seat. Such an embodiment requires a very good dimensional control of two distinct parts, the dispensing system and the bottle neck, which are usually not manufactured by the same manufacturer and sometimes are not even made of the same material or by the same method. It is easy to achieve a permanent seal between a pump and a reservoir, but it is much more difficult to achieve an intermittent seal between two distinct components that must cease beyond a threshold pressure, as is the case for a valve.

In addition, the manufacturer of the dispensing system cannot perform compliance testing of such a valve in the production process since he does not manufacture the entire valve. It is thus unable to commit to a level of quality and performance of this valve.

Finally, when the reservoir is made of plastic, it is not moulded like the dispensing system, but is made using an extrusion blow moulding or injection blow moulding method. The latter methods offer less dimensional control than the moulding method. As a result, it is even more difficult to design a valve having for seat a bottle neck that is necessarily less well defined in terms of dimensions than the dispensing system. When the reservoir is made of glass, the dimensional control is even less good.

This is why it is important to provide valves whose flaps and seats all belong to the dispensing system, and not to the reservoir for some.

According to the various embodiments of the invention, which may be taken together or separately:

- said four flaps belong to four of the five valves of the system.
- the deformable element comprises five flaps belonging to the five valves.

The system provides for a single part referred to as deformable element, which shares many functions for the circulation of the air and the product within the dispensing system. In this case, this deformable element comprises the membrane (to define the volume of the product metering chamber), the product inlet and outlet flaps (for the operation of the product pump), and the air inlet and outlet flaps (for the operation of the air pump). Having only one element to perform all of these functions allows to reduce the number of parts within the dispensing system, and also allows to create a technical synergy between the air pump and the product pump. It is even possible to take this approach a step further by providing an additional functionality on the deformable element, namely an air return flap, which is necessary in the case of a dispenser with air return. The dispensing system then comprises an air return valve for the recovery of the air of the reservoir formed in part by this air return flap belonging to the deformable element.

- the deformable element is a very compact part, and is easy to produce, preferably by moulding.
- the deformable element is made of an elastic material. It is therefore designed in a single material with elastic properties.
- the deformable element is preferably made of a polymeric material, such as a thermoplastic elastomer (TPE).
  - the system comprises an actuating head comprising a barrel extending in the direction of the membrane and against which an air outlet flap belonging to the deformable element bears, the barrel and the air outlet flap forming the air outlet valve, said barrel being configured to exert a pressure on the membrane so as to deform it from the initial state to the deformed state.
  - the air outlet flap consists of an annular lip which is pressed against the barrel.
  - the deformable element comprises a chimney through which a guiding rod passes, said chimney sliding along the rod when the membrane undergoes said deformation, said chimney comprising a body surmounted by a product outlet flap surrounding the rod and separated in part from the body by a slot, the chimney forming the product outlet valve, the product being able to exit through the slot.
  - said product outlet flap consists of a washer enclosing the rod.
  - the slot is defined by two edges, referred to as a first edge belonging to the outlet flap and a second edge belonging to the body, said first and second edges being in contact with each other when the product outlet valve is closed, and separated from each other when the product outlet valve is open: the slot thus closes "edge to edge" by contact of said edges.
- the system comprises a base to which the deformable element is fixed, said base comprising a bottom forming in part the product metering chamber, at least one product passage hole being embodied in the bottom, said hole being closed by a product inlet flap belonging to the deformable element, the product inlet flap and the bottom forming the product inlet valve.
- said product inlet flap consists of a flexible collar which is pressed against the bottom.
- the system comprises a hoop having an inner sleeve on which the deformable element is positioned, said sleeve being adapted to be mounted on the reservoir of the dispenser, said sleeve comprising a rim against which the air return flap bears, the rim and the air return flap forming the air return valve.
- said air return flap consists of a flexible lip which is pressed against the rim.
- the system comprises an actuating head comprising a cylinder comprising a side wall forming in part the air metering chamber, an air inlet flap belonging to the deformable element resting on this side wall, the side wall and the air inlet flap forming the air inlet valve.
- said air inlet flap consists of a flexible lip which is pressed against the side wall of the cylinder.

According to other embodiments of the invention, which may be taken together or separately:

- these pumps are operated by an actuating head.
- said air pump comprises a variable volume air metering chamber integrally delimited by two parts of the system, namely the deformable element and a part belonging to the actuating head, said part belonging to the actuating head being movable relative to the deformable element to vary the volume within the air metering chamber: the design of the air pump is greatly simplified since the air metering chamber is defined by only two parts of the system. Parts of the product pump are used to define the air metering chamber of the air pump. In this way, there are common parts for both pumps in the system, and the number of parts in the system is reduced. In this case, the deformable element shares several functions, namely that of delimiting the product metering chamber, that of delimiting the air metering chamber, and that of varying the volume of the product metering chamber by elastic deformation. The same applies to the part belonging to the actuating head, which allows to participate in the actuation of the system, which allows to delimit the air metering chamber, and which allows to vary the volume of the air and product metering chambers by its movement.
- the actuating head comprises a cylinder surmounted by a push button, said cylinder being arranged between the push button and the deformable element, said cylinder corresponding to said part belonging to the actuating head and which partly delimits the air metering chamber.
- the cylinder has a cylindrical side wall and is closed at the upper portion by an upper wall corresponding to a piston to which the push button is attached, said side wall and said piston forming in part the air metering chamber.
- the cylinder comprises an internal barrel extending from the piston toward the product metering chamber and being configured to exert pressure on a membrane of the deformable element so as to elastically deform it between an initial state where the product metering chamber has a maximum volume and a deformed state where the product metering chamber has a minimum volume, said barrel forming in part the air metering chamber.

the piston has a shape complementary to the shape of the deformable element when the membrane is in its deformed state.

the deformable element comprises a ring extending around a lower portion of the membrane, the ring and the membrane defining in part the air metering chamber.

said ring has an upper skirt contacting the side wall of the cylinder and capable of sliding along the side wall when the system is actuated.

in the rest position of the system, the piston is at a distance from the ring of the deformable element, and the air volume is maximum within the air metering chamber.

in the actuating position of the system, the piston is in the vicinity of the ring of the deformable element, and the volume of air is minimal within the air metering chamber.

the upper skirt in contact with the side wall forms an air inlet flap to the air metering chamber, the end of the upper skirt being formed with a flexible lip movable between a position pressed against the side wall to close the air metering chamber, and a position lifted from the side wall to admit air into the air metering chamber.

the deformable element comprises an air outlet flap consisting of a flexible lip movable between a position pressed against the barrel of the cylinder to close the air metering chamber, and a position lifted from the barrel to exhaust air from the air metering chamber.

the lip of the air outlet flap is arranged inside the barrel and is in contact with the inner wall of the barrel, the deformable element penetrating into the interior of the barrel.

the deformable element is made of a single material with elastic properties, preferably of a polymer material, such as a thermoplastic elastomer (TPE).

the cylinder (6) is made of a single rigid material, for example polypropylene or polyethylene. The invention also relates to a foam dispenser, in particular for cosmetic foam, comprising a reservoir capable of storing a foaming product and on which is mounted a dispensing system as described above.

said system also comprises a hoop having an inner sleeve on which the deformable element is positioned, said sleeve being adapted to be mounted on the neck of a reservoir of the dispenser, said dispensing head being movable between a rest position and an actuating position where it coaxially surrounds said sleeve: the dispensing head is thus positioned around the sleeve, so as to limit the axial overall dimension of the system.

the air metering chamber surrounds the product metering chamber, said product and air chambers extending in an axial and radial space exclusively delimited by the sleeve and the dispensing head: the chambers are nested so as to contain them in a same, reduced space, and thus to reduce the axial and radial overall dimension of the chambers within the device. In other words, the air metering chamber expands around the product metering chamber, or the product metering chamber is integrated inside the air metering chamber. The chambers are exclusively delimited by the sleeve and the dispensing head, which means that no part of the system penetrates into the body of the reservoir, i.e. the reservoir portion located below the neck. There is no contact between mechanical parts of the system and the product contained in the reservoir. This allows to limit the risks of contamination of the product on the one hand, and to limit the risks of degradation of the materials of the mechanical parts by the product which could have aggressive properties towards certain materials.

said actuating head comprises a cylinder topped by a push button, said cylinder being arranged between the push button and the deformable element.

said product and air pumps extend in an axial and radial space exclusively delimited by the sleeve and the cylinder, both in the rest position of the system and in the actuating position of the system.

the hoop has an annular housing defined between the sleeve and an outer decorative wall, said cylinder sliding within this housing.

the cylinder is completely hidden inside the hoop disc when the system is in its actuating position.

the cylinder has a side wall that slides within the housing of the hoop.

the air metering chamber is integrally delimited by two parts of the system, namely the deformable element and the cylinder, said cylinder being movable relative to the deformable element to vary the volume within the air metering chamber.

the system comprises a base to which the deformable element is fixed, the product metering chamber being integrally delimited by two parts of the system, namely the deformable element and said base.

the sleeve is closed at the upper portion by a support for accommodating said base, this accommodating support comprising a socket suitable for receiving a dip tube.

the deformable element comprises a membrane that is elastically deformable between an initial state where the volume of the product metering chamber is maximum and a deformed state where the volume of the product metering chamber is minimum, said membrane expanding within said cylinder.

the membrane, on the inner side, partially delimits the product metering chamber.

the membrane, on the external side, partially delimits the air metering chamber.

the cylinder is closed at the upper portion by an upper wall corresponding to a piston to which the push button is attached, the cylinder also comprises an internal barrel extending from the piston towards the product metering chamber and being configured to exert a pressure on the membrane of the deformable element so as to deform it elastically between its initial state and its deformed state.

the piston partially delimits the air metering chamber and is movable relative to the deformable element between a raised position where the air volume is maximum within the air metering chamber and a depressed position where the air volume is minimum within the air metering chamber.

The invention also relates to a foam dispenser, in particular for cosmetic foam, comprising a reservoir capable of storing a foaming product and on which a dispensing system as described above is mounted. The product and air pumps run exclusively in the neck and above the neck.

BRIEF DESCRIPTION OF FIGURES

Further characteristics and advantages of the invention will become apparent from the following detailed description, for the understanding of which reference is made to the attached drawings in which:

FIG. 1 is an axial cross-section and perspective view of a foam dispensing system in the rest position;

FIG. 2 is an exploded view of the dispensing system in FIG. 1;

FIG. 3 is a cross-sectional view of the dispensing system, according to FIG. 1, in the rest position;

FIG. 4 is an enlarged view of the area circled in FIG. 3;

FIG. 5 is a cross-sectional view of the dispensing system at the beginning of actuation;

FIG. 6 is an enlarged view of the area circled in FIG. 5;

FIG. 7 is a cross-sectional view of the dispensing system in the actuating position;

FIG. 8 is a cross-sectional view of the dispensing system as it rises to the rest position;

FIG. 9 is an enlarged view of the area circled in FIG. 8.

DETAILED DESCRIPTION OF THE INVENTION

The invention relates to a foam dispensing system for a foaming product dispenser, in particular a cosmetic foaming product.

This dispensing system comprises an air pump and a product pump, with multiple valves allowing to create product and air circulations within the system, so that the air and the product mix and form a foam to be dispensed at the outlet.

This dispensing system can be positioned on a reservoir (not shown) intended to contain the foaming cosmetic product, in particular liquid soap.

As illustrated in FIGS. 1, 2, and 3, the dispensing system is primarily composed of an actuating head 1, a deformable element 2, a base 3, and a hoop 4. More concretely, the actuating head 1 consists of a push button 5 on top of a cylinder 6. The system thus consists of only five parts. By limiting the number of parts, a considerable amount of time is saved when assembling the dispensing system.

A joint 7 is located between the hoop 4 and the neck of a reservoir to seal the reservoir.

This dispensing system comprises no metal parts. It is intended to be used on any type of reservoir.

All references used in this description are annotated in FIG. 3. The other figures do not show all the references for the sake of readability.

The function of the push-button 5 is to allow the pumps to be actuated by a user.

The push-button 5 has a cylindrical body which can be interlocked onto the cylinder 6. This cylindrical body is surmounted by an upper portion in which there is a nozzle 52 facing an outlet orifice 53, this upper portion having an upper support wall 51 on which the user exerts a pressure to operate the pumps.

The nozzle 52 allows to create foam from a mixture of product and air that arrives at the inlet of the push-button 5. This foam is dispensed through the outlet orifice 53 of the push-button.

At the level of its body, the push-button 5 presents a central cylindrical section 54 able to interlock on a corresponding central cylindrical section 63 provided on the cylinder 6. The two cylindrical sections 54, 63 can be snapped together by means of annular snap rings for example. Any other attachment system can be considered.

The mixture of product and air flows through these two cylindrical sections 54, 63 and arrives in a mixing chamber 15 located upstream of the nozzle 52 within the upper portion of the push-button 5, before passing through the nozzle 52 and exiting the dispensing system as foam. The nozzle 52 comprises two screens, one 55 arranged at the nozzle 52 inlet, and the other 56 arranged at the nozzle 52 outlet, which allow the creation of foam.

The push-button 5 is preferably made of a single material, for example polypropylene. The same applies to the nozzle 52.

The cylinder 6 of the actuating head 1 has a cylindrical side wall 61 closed at the upper portion by a piston 62 from which extends the cylindrical central section 63 accommodating the push-button 5. In the opposite direction, another cylindrical central section 64 extends from the piston 62, i.e., towards the reservoir. This other central cylindrical section is referred to as barrel 64 for clarity. This barrel 64 cooperates with the aforementioned deformable element 2, and actively participates in the operation of the air pump as well as the product pump, as will be explained in the following. This barrel 64 has notches at the level of its free end for the passage of air to the interior of the barrel 64.

The side wall 61 of the cylinder 6 slides inside the hoop 4. The cylinder 6 can be moved between a raised position, i.e. the rest position of the dispensing system, and a depressed position, i.e. the actuating position of the dispensing system.

The actuating head 1 (i.e. the push-button 5 and cylinder 6 assembly) is thus mobile in translation with respect to the hoop 4, deformable element 2, and base 3 assembly.

The cylinder 6 is made of a single, rigid material, for example polypropylene or polyethylene.

The hoop 4 consists of an outer decorative wall 41, connected to an inner sleeve 42. The outer decorative wall 41 and the sleeve 42 are U-shaped in cross-sectional view, and form a housing 11 within the U in which the side wall 61 of the cylinder 6 slides. The housing 11 of the hoop 4 thus serves as means for guiding the actuating head 1. As a safety measure, to prevent the actuating head 1 from moving out of the housing 11 when it moves from its depressed position to its raised position, the cylindrical side wall 61 of the cylinder 6 is provided with a circumferential shoulder 65 capable of coming in abutment with an internal annular rim located at the free end of the outer decorative wall 41 of the hoop 4.

The sleeve 42 can be mounted on a reservoir containing the cosmetic product. For example, the sleeve 42 may be provided with an internal thread so that it can be screwed onto a threaded neck of the reservoir. Any other attachment device between the sleeve 42 and the neck of the reservoir can be considered. The sleeve 42 is closed at the upper portion by a support 45 for accommodating the base 3 and the deformable element 2. This accommodating support 45 comprises a central socket 46 suitable for accommodating a dip tube immersed in the reservoir.

Preferably, the accommodating support 45 and its socket 46 extend into an axial and radial space exclusively delimited by the sleeve 42. Eventually, the socket 46 can be lowered a little inside the reservoir if needed, depending on the associated dip tube.

The hoop 4 is preferably made of a single material, for example polypropylene.

The deformable element 2 is positioned in the centre of the dispensing system, i.e. inside the cylinder 6 and the hoop 4. It is the heart of the product pump and also partly defines the air pump.

The deformable element 2 comprises an elastically deformable supple membrane 21, and has a rounded dome shape when the dispensing system is in the rest position (i.e. when the actuating head 1 is raised) and a folded dome shape when the dispensing system is in the actuating position (i.e. when the actuating head 1 is depressed). This rounded dome shape allows the membrane 21 to deform away from the central axis of the dispensing system in increasing perimeters. This deformation does not affect the operation of the pumps in any way.

This membrane 21 ends at the lower portion with an inner collar 27 directed towards the inside of the dome.

The deformable element 2 also comprises an outer ring 22 extending around the lower portion of the membrane 21.

This ring 22 rests on the base 3, and is in contact with the sleeve 42 and the cylinder 6. In this case, it has an upper skirt 23 coming into contact with the side wall 61 of the cylinder 6 and being able to slide along this side wall 61 when the system is actuated. It also has a lower skirt 25 that comes into contact with a rim 49 provided on the accommodating support 45 of the sleeve 42.

Finally, the ring 22 comprises a tab 26 for hooking with the base 3.

The deformable element 2 comprises a chimney 29 extending around an upper portion of the membrane 21. Specifically, this chimney 29 extends from the summit of the dome, and is directed towards the push-button 5. The chimney 29 fits inside the barrel 64 of the cylinder 6. An annular lip 28, visible in FIG. 4, extends from this chimney 29 and is suitable for coming into contact with the inner wall of the barrel 64 of the cylinder 6. In this way, the chimney 29 of the deformable element 2 is centred with respect to the barrel 64 of the cylinder 6.

The upper end of the chimney 29 is constricted, and thus has a smaller internal diameter than the rest of the chimney, referred to as the body of the chimney 29. This upper end is referred to as the "washer 20" for clarity.

The deformable element 2 is here formed from a single elastic material, preferably a polymeric material, for example thermoplastic elastomer (TPE). It comprises more or less flexible areas depending on their thicknesses. In this case, the most flexible areas, having the more suppleness, corresponds to the inner collar 27, the upper skirt 23, the lower skirt 25, the washer 20 and the annular lip 28 around the chimney 29. All these flexible areas are flaps for the passage of product or air.

The base 3 is a part that cooperates with the deformable element 2. The base 3 comprises a hooking tab 36 adapted to snap into place with the hooking tab 26 of the ring 22 of the deformable element 2. These two tabs 36, 26 have an annular snap ring that allows them to snap-fit. Any other form of interlocking or joining could be considered.

This base 3 has a bottom 31 from which extends a rod 33 for guiding the deformable membrane 21. This guiding rod 33 passes completely through the deformable element 2. This rod 33 is arranged substantially along the longitudinal axis X of the deformable element 2, which is coaxial with the central axis of the sleeve 42 as well as the central axis of the push-button 5 and the cylinder 6. This guiding rod 33 passes through the deformable element 2, so that the latter slides along the rod 33 when it undergoes a deformation. The rod 33 comprises a body topped by a head 34 at the level of its free end, having a diameter greater than that of the body of the rod 33. Thus, there is a shoulder between the head 34 and the body of the rod 33, as shown in FIG. 4.

The body of the rod 33 passes through the deformable membrane 21 and the chimney 29. The rod head 34 protrudes from the chimney 29. As said before, the chimney 29 of the deformable element 2 comprises a narrowing at the level of its free end, referred to as washer 20, located just upstream of the rod head 34, i.e. under the rod head 34. More precisely, the walls of the chimney 29 are at a distance from the body of the rod 33, while the washer is in contact with the body of the rod 33, and presses under the shoulder formed by the rod head 34. The washer 20 thus comes into axial abutment against the rod head 34.

A cut is made in the body of the chimney 29, in the vicinity of the washer 20, so as to form a slot 10. Thus, the washer 20 of the chimney 29 can open and move out of alignment with the body of the chimney 29 upon actuation of the system. This washer 20 opens and closes in relation to the body in the form of a flap.

The amount of opening of the washer 20 is limited by a plurality of ribs 66 extending radially from the piston 62, between the two central cylindrical sections 63, 64 of the cylinder 6. When it opens, the washer 20 comes in abutment with these ribs 66.

The inner collar 27 of the supple membrane 21 rests on the bottom 31 of the base 3.

The bottom 31 of the base 3 also comprises a protrusion 35 that can be fitted into a notch 48 provided for this purpose in the accommodating support 45 of the sleeve 42. Preferably, this protrusion 35 is able to snap into the notch 48 so as to secure the base 3 to the sleeve 42. Any other form of attachment could be considered within the scope of the present invention.

The base 3 is preferably made of a single material, for example polypropylene.

The bottom 31 of the base 3 and the deformable membrane 21 define a metering chamber 13 of the product belonging to the product pump of the dispensing system. This product metering chamber 13 is located inside the membrane 21. There is an product inlet valve for the product to enter toward the interior of the metering chamber 13 of the product, as well as a product outlet valve.

The product is admitted by means of at least one inlet hole 32 made in the bottom 31 of the base 3. Preferably, there are several holes 32 distributed in the bottom 31. This hole 32 is covered by said inner collar 27 of the membrane 21. This collar 27 is capable of lifting from the bottom 31 to allow product to enter the product metering chamber 13 via the hole 32, or of pressing against the bottom 31 to close the inlet valve and seal the product metering chamber 13. The inner collar 27 thus constitutes a product inlet flap, while the bottom 31 of the base 3 constitutes the seat of the inlet valve.

The product is discharged through the slot 10 embodied in the chimney 29. In fact, when the washer 20 is pressed against the body of the chimney 29 the product outlet valve is closed. On the other hand, when the washer 20 is lifted from the body of the chimney 29, due to the opening of the slot 10, then the product outlet valve is opened, and product can escape from the product metering chamber 13. The washer 20 is therefore the flap of the outlet valve. The slot 10 is defined by two edges, namely a first edge belonging to the outlet flap and a second edge belonging to the body, said first and second edges being in contact with each other when the outlet product valve is closed, and separated from each other when the product outlet valve is open: the slot thus closes "edge to edge" by contact of said edges.

The membrane 21 of the deformable element 2 is deformable between an initial state shaped like a rounded dome, in which the product metering chamber 13 has a maximum volume, and a deformed state, shown in FIG. 7, in which the product metering chamber 13 has a minimum volume.

The function of the rod 33 is to guide the membrane 21 as it moves from the initial state to the deformed state, and then from the deformed state back to the initial state. The membrane 21 is thus configured to be able to fold the summit of the dome toward the base of the dome, i.e., toward the inner collar 27. The chimney 29 of the deformable element 2 also moves towards the base of the dome along the rod 33. Thanks to the rod 33, the membrane 21 remains centred around the longitudinal axis X of the dispensing system. This avoids the risk of poorly controlled folding of the membrane 21.

To deform the deformable element 2, the actuating head 1 comprises a deforming means arranged outside the metering chamber 13 of the product and configured to exert a pressure on the membrane 21 when the push-button 5 is actuated. This deforming means is the barrel 64 of the cylinder 6 which has an open end in contact with the membrane 21. The chimney 29 of the deformable element 2 extends inside the barrel 64, and the end of the barrel 64 contacts the summit of the dome, and presses against the dome upon the actuation of the system to deform the membrane 21.

The cylinder 6 and the deformable element 2 define an air metering chamber 14 belonging to the air pump of the dispensing system. This air metering chamber 14 is located outside the membrane 21. In this way, the air metering chamber 14 expands around the product metering chamber 13.

There is an air inlet valve for the air to enter toward the interior of the air metering chamber 14, as well as an air outlet valve.

The air is admitted via the contact between the upper skirt 23 of the deformable element 2 and the cylindrical side wall 61 of the cylinder 6. In the present case, the end of the upper skirt 23 is thinned and forms a lip 24 that rests against the inner surface of the side wall 61 of the cylinder 6. The lip 24 of the upper skirt 23 forms an air inlet flap within the air metering chamber 14. In effect, the lip 24 of the upper skirt 23 is movable between a position pressed against the side wall 61 of the cylinder 6, where the air inlet valve is then closed, and a position raised from the side wall 61 of the cylinder 6, where the air inlet valve is then open, and air can enter by passing between the upper skirt 23 and the side wall 61 of the cylinder 6.

The air is exhausted via the contact between the projecting annular lip 28 of the chimney 29 of the deformable element 2 and the barrel 64 of the cylinder 6. In this case, the annular lip 28 rests against the inner surface of the barrel 64. The annular lip 28 thus forms an air outlet flap within the air metering chamber 14. In effect, the lip 28 is movable between a position pressed against the barrel 64, where the air outlet valve is then closed, and a position raised from the barrel 64, where the air outlet valve is then open, and air can exit the chamber 14 by passing between the annular lip 28 and the barrel 64.

When the dispensing device is actuated, the cylinder 6 slides in the hoop 4, and the piston 62 of the cylinder 6 is movable between a raised position located at a distance from the ring 22 of the deformable element 2, and a depressed position located in the vicinity of the ring 22 of the deformable element 2. In the raised position of the piston 62, the volume of the air metering chamber 14 is at its maximum. In the depressed position of the piston 62, the volume of the air metering chamber 14 is minimal. The volume of the air metering chamber 14 thus varies with the position of the piston 62. The piston 62 has a shape complementary to that of the ring 22 of the deformable element 2. Thus, when the piston 62 is in the depressed position, there is almost no space left between the piston 62 and the ring 22 of the deformable element 2, since one follows the profile of the other.

The volume of the metering chamber is thus close to zero, which allows to improve the compactness of the air pump. Almost zero volume allows:

- a better distribution rate of the product because the whole chamber is emptied;
- a better product suction afterwards because the depression is more pronounced.

In this spirit, the piston 62 even comprises a recess 67 in which the upper skirt 23 of the ring 22 of the deformable element 2 is housed to follow the profile even better.

The dispensing system also comprises an air return valve for the recovery of the air of the reservoir, which is partly formed by an air return flap belonging to the deformable element 2 and is required in the case of a dispenser with air return.

In this case, the lower skirt 25 of the ring 22 of the deformable element 2 consists of a flexible lip coming into contact with the rim 49 formed on the accommodating support 45 of the sleeve 42, as previously mentioned. This lower skirt 25 forms the air return flap. In effect, this lower skirt 25 is movable between a position pressed against the rim 49, where the air return valve is then closed, a position lifted from the rim 49, where the air return valve is then open, and air can pass between the deformable element 2 and the sleeve 42, until reaching the interior of the reservoir by means of an air return orifice 47 fitted in the accommodating support 45.

In the following we will describe the operation of the dispensing system with its two pumps.

In FIGS. 3 and 4, the dispensing system is at rest. In this position, the product pump is sealed. Indeed, the elastic reaction of the pre-stressed membrane 21 tends to push the washer 20 upwards and wedge it under the rod head 34. The washer 20 is then pinched between the rod head 34 and the body of the chimney 29. In this case, the slot 10 is closed, which means that the product outlet valve is closed.

The membrane 21 is in its initial state, i.e. dome-shaped, with a maximum product volume in the product metering chamber 13. The inner collar 27 of the membrane 21 is pressed against the bottom 31 of the base 3: the product inlet valve is thus closed.

The actuating head 1 is in the raised position, and the piston 62 is therefore at a distance from the ring 22 of the deformable element 2. The volume of the air metering chamber 14 is therefore maximum. In this position, the air pump is sealed. Indeed, the upper skirt 23 of the deformable element 2 is pressed against the side wall 61 of the cylinder 6, and the annular lip 28 of the deformable element 2 is pressed against the barrel 64 of the cylinder 6.

The air return valve is also closed since the lower skirt 25 of the deformable element 2 is pressed against the rim 49 of the sleeve 42.

In FIGS. 5 and 6, a user presses the push-button 5. The dispensing system is in a position of actuating start.

The cylinder 6 slides inside the housing 11 formed in the hoop 4 and moves down the hoop 4.

In its stroke, the barrel 64 of the cylinder 6 presses on the summit of the dome of the elastic membrane 21, so as to deform it. The volume of the product metering chamber 13 thus decreases, and the pressure in the product metering chamber 13 increases. In its stroke, the barrel 64 of the cylinder 6 also causes the chimney 29 of the deformable element 2 to descend towards the base 3. The washer 20 being tight on the rod 33, it tends to stay in place and eventually slide down with restraint while the body of the chimney 29 descends easily, which causes the opening of the slot 10, thus freeing the passage of the product (or the passage of the air when booting the system). The fluid outlet valve is then opened, and the product can escape from the product metering chamber 13 through the chimney 29, then through the slot 10, then between the ribs 66 of the piston 62, until it arrives in the mixing chamber 15 of the push-button 5, as illustrated by the long right arrow in FIG. 6. The product inlet valve remains closed. In other words, the internal pressure in the product metering chamber 13 as well as the elasticity of the membrane 21 tends to press the inner collar 27 of the membrane 21 against the bottom 31 of the base 3.

During its stroke, the piston 62 of the cylinder 6 moves closer to the ring 22 of the deformable element 2, and the volume of the air metering chamber 14 decreases. This increases the pressure in the air metering chamber 14, causing the upper skirt 23 of the ring 22 to be pressed against the inner surface of the side wall 61 of the cylinder 6, and also causing the annular lip 28 to lift off the barrel 64. The annular lip 28 thus approaches the chimney 29, as illustrated by the two small arrows in FIG. 6. The air outlet valve is then opened, allowing the air trapped in the air metering chamber 14 to escape by passing between the barrel 64 and the annular lip 28, and then between the ribs 66 of the piston 62, until it reaches the mixing chamber 15 of the push-button 5, as illustrated by the long left arrow in FIG. 6.

At the end-of-stroke of the actuating head 1, as shown in FIG. 7, the dispensing system is in the end of actuating position. The side wall 61 of the cylinder 6 reaches the end of the housing 11 provided in the hoop 4. During this sliding of the cylinder 6 in the hoop 4, the air initially contained in the housing 11 is progressively evacuated via a plurality of orifices 12 provided in the bottom of the housing 11 to avoid an overpressure inside the housing 11. The barrel 64 of the cylinder 6 has deformed the membrane 21 to the maximum and it is in a folded position corresponding to its deformed state, with the summit of the dome coming into contact with the bottom of the base 3. The volume of the product metering chamber 13 is minimal. A maximum of the product contained in the product metering chamber 13 is discharged via the outlet valve. The washer 20 still remains offset from the body of the chimney 29, the slot 10 is still open.

The piston 62 is in the depressed position, in the vicinity of the ring 22 of the deformable element 2. The volume of the air metering chamber 14 is minimal. As much air as possible is discharged from this chamber 14 via the air outlet valve. The annular lip 28 is always lifted from the barrel 64, and the upper skirt 23 is always pressed against the side wall 61 of the cylinder 6. Upon the actuation of the actuating head 1, this upper skirt 23 slid along the side wall 61, while maintaining permanent contact with it.

The air return valve is always closed.

All the air and the product that was discharged from the metering chambers was transferred to the mixing chamber 15 of the push-button 5 and then passed through the nozzle 52 which turned it into foam which was then dispensed through the outlet orifice 53 of the push-button 5.

In FIGS. 8 and 9, the user releases the pressure exerted on the push-button 5, and the latter then starts to rise towards its resting position, thanks to the elastic reaction of the membrane 21 which tends to push on the barrel 64 of the cylinder 6 to thus raise it, as illustrated by the two small arrows located under the summit of the folded dome in FIG. 8.

As the membrane 21 rises, the chimney 29 rises along the rod 33, and the washer 20 slides along the rod 33. The raising of the body of the chimney 29 allows to close the slot 10, and thus to close the product outlet valve.

This raising of the membrane 21 and of the chimney 29 causes the volume of the product metering chamber 13 to increase, resulting in an internal depression within the product metering chamber 13. This depression, combined with the push of the product from the reservoir, causes the product inlet valve to open. In this case, the internal collar 27 lifts off the bottom 31 of the base 3, as shown by a small arrow in FIG. 8, and the product can thus pass from the reservoir to the product metering chamber 13 through the socket 46 of the sleeve 42, then between the accommodating support 45 and the bottom 31, and then through the product inlet orifice 32 provided in the bottom 31, as shown by the long arrow in FIG. 8.

In addition, the upward movement of the piston 62 causes the volume of the air metering chamber 14 to increase, resulting in an internal depression within the air metering chamber 14. This depression causes the air inlet valve to open. In this case, the upper skirt 23 moves away from the side wall of the cylinder 6, as illustrated by the small arrows in FIG. 8, and air can thus pass between the upper skirt 23 and the cylinder 6 into the air metering chamber 14. This air comes from the outside, passes inside the housing 11 of the hoop 4, passing first either between the outer decorative wall 41 of the hoop 4 and the side wall 61 of the cylinder 6, or through the orifices 12 of the hoop 4, and then up between the side wall 61 of the cylinder 6 and the sleeve 42 until it arrives at the level of the upper skirt 23.

Some of this outside air also enters the reservoir through the opening of the air return valve. Indeed, when the push-button 5 is raised, the admission of product into the product metering chamber 13 causes a depression within the reservoir containing the product, which causes air to be sucked in via this air return valve.

In particular, the air suction will tend to move the lower skirt 25 of the deformable element 2 away from the rim 49 of the sleeve 42. The lower skirt 25 thus approaches an annulus 44 provided on the accommodating support 45, as illustrated by the small arrow in FIG. 9. The seal is thus broken, and the outside air can thus pass first through notches provided on the rim 49, then between the lower skirt 25 and the rim 49, then through slots provided in the annulus 44 of the accommodating support 45, then between the bottom 31 of the base 3 and the accommodating support 45, and finally through the air return orifice 47 allowing it to arrive inside the reservoir containing the cosmetic product.

This path of outside air to the air metering chamber 14 and to the reservoir is illustrated by the two long arrows in FIG. 9.

The air and product suction continues until the washer 20 comes to rest against the rod head 34.

The dispensing device then returns to its initial rest state, as shown in FIGS. 1 and 3. The elastic reaction of the pre-stressed dome during the assembly of the system allows the washer 20 to be plated to the body of the chimney 29.

As the depression drops, the inner collar 27 press back onto the product inlet orifice 32. The product metering chamber 13 is then hermetically sealed. Similarly, as the depression has dropped in the air metering chamber 14, the upper skirt 23 presses back against the side wall 61 of the cylinder 6 and the annular lip 28 presses back against the barrel 64 of the cylinder 6. The air metering chamber 14 is then sealed.

The lower air return skirt 25 returns to its position, and presses back against the rim 49 of the sleeve 42. The reservoir is then sealed again.

The air metering chamber 14 and the product metering chamber 13 each contain a new dose of product and air ready to be dispensed to form a dose of foam at the outlet of the dispensing device.

In the following, we will describe the advantages of the dispensing system with its two nested pumps.

First of all, the actuating head 1 is movable between a rest position, i.e. a raised position, and an actuating position, i.e. a depressed position. In the actuating position, the head coaxially surrounds said sleeve 42. More precisely, the cylinder 6 of the actuating head 1 enters the housing 11 of the hoop 4 and is positioned around the sleeve 42, being completely "hidden" in the hoop 4. This interlocking between the cylinder 6 and the hoop 4 allows to limit the axial overall dimension of the system.

In addition, the product metering chamber 13 is integrated within the air metering chamber 14. The two chambers are thus also nested within each other, so as to limit their overall dimension within the system. Said fluid and air chambers extend into an axial and radial space exclusively bounded by the sleeve 42 and the actuating head 1. When the system is mounted on a reservoir, the product and air pumps extend above the reservoir, and into the neck of the reservoir. Under no circumstances should the pumps penetrate lower than the neck of the reservoir. They are therefore not in contact with the product contained in the reservoir. This allows to limit the risk of contamination of the product. In addition, they free up space in the reservoir, so it can hold more product.

Furthermore, in the present invention, the deformable element 2 comprises, for each valve, a flap movable between an open state of the valve and a closed state of the valve.

The idea is to provide a single part, namely the deformable element 2, which mutualizes many functions for the circulation of the air and the product within the dispensing system. In this case, this deformable element 2 includes the membrane 21 (to define the volume of the product metering chamber 13), the product inlet 27 and outlet 20 flaps (for the operation of the product pump), the air inlet 23 and outlet 28 flaps (for the operation of the air pump), and the air return flap 25 (necessary in the case of a dispenser with air return in the reservoir). Having only one element 2 to perform all these functions allows to reduce the number of parts in the dispensing system, and also allows to create a technical synergy between the air pump and the product pump. The deformable element 2 according to the invention is a part that can be folded in a very compact manner, and is easy to make, preferably by moulding.

Another advantage of the present invention is the use of parts that participate in the definition and the activation of both pumps simultaneously. In this way, there are common parts for both pumps in the system, and the number of parts in the system is reduced. In this case, the deformable element 2 shares several functions, namely that of delimiting the product metering chamber 13, that of delimiting the air metering chamber 14, and that of varying the volume of the product metering chamber 13 by elastic deformation. The same applies to the cylinder 6 belonging to the actuating head 1, which allows to participate in the actuation of the system, which allows to delimit the air metering chamber 14, which allows to vary the volume of the air metering chamber 14 by transverse movement, and which allows to deform the membrane 21 of the product metering chamber 13.

In general, the design of the air pump is greatly simplified since the air metering chamber 14 is defined by only two parts of the system, namely the cylinder 6 and the deformable element 2.

The same is true for the product pump, which is greatly simplified since the product metering chamber 13 is defined by only two parts of the system, namely the base 3 and the deformable element 2.

The configurations shown in the cited figures are only possible examples, in no way limiting, of the invention which, on the contrary, encompasses the variations of shapes and designs within the reach of the person skilled in the art.

The invention claimed is:

1. A foaming product dispenser, comprising:
- a distribution system, comprising:
  - an actuation head, comprising:
    - a push button;
    - a nozzle in the push button; and
    - a cylinder attached to the push button;
  - a fret, comprising:
    - an outer decorative wall;
    - an inner sleeve;
    - a housing between the outer decorative wall and inner sleeve, wherein a portion of the actuation head is movable in the housing;
  - a base, comprising:
    - a bottom seated on the fret;
    - an intake port in the bottom; and
    - a rod extending from the bottom towards the actuation head;
  - a deformable element attached to the fret and the base, forming a product chamber between the deformable element and the base and an air dosing chamber between the deformable element and the actuation head, the deformable element comprising:
    - a flange controlling the flow of product into the product chamber through said intake port;
    - a slot controlling the flow of product out of the product chamber;
    - a lip controlling the flow of air into the air dosing chamber; and
    - an annular lip controlling the flow of air out of the air dosing chamber.

2. The foaming product dispenser of claim 1, wherein the flange is moveable from an open position allowing a flow of product through the product inlet valve to a closed position preventing flow of product through the product inlet valve.

3. The foaming product dispenser of claim 1, wherein the lip further comprises an upper skirt of the deformable element, wherein the upper skirt is engaged with an inner wall of the cylinder in a closed position and the upper skirt is disengaged with the inner wall of the cylinder in an open position.

4. The foaming product dispenser of claim 1, wherein the annular lip extends into an interior of a drum, wherein the annular lip is in contact with an interior wall of the drum in a closed position and is disengaged from the interior wall of the drum in an open position.

5. The foaming product dispenser of claim 1, wherein the push button further comprises:
- a central cylindrical section;
- an outlet orifice in communication with the central cylindrical section; and
- an upper support wall.

6. The foaming product dispenser of claim 1, wherein the nozzle further comprises:
- an inlet; and
- an outlet.

7. The foaming product dispenser of claim 6, further comprising:
a first mesh arranged at the inlet; and
a second mesh arranged at the outlet.

8. The foaming product dispenser of claim 1, further comprising a reservoir attached to the foaming product dispenser, and wherein the deformable element further comprises a lower skirt allowing atmospheric venting into the reservoir on the return stroke.

9. A foam dispensing system, comprising:
a reservoir;
a distribution system, comprising:
an air pump, comprising:
a slidable piston; and
a deformable element; and
an air dosing chamber between the piston and an exterior of the deformable element, wherein the air dosing chamber is decreased in volume during an actuation stroke and increased in volume during recovery;
a product pump, comprising:
a base comprising an intake port, the piston being slidably movable relative to the base; and
the deformable element; and
a product dosing chamber between the base and an interior of the deformable element, wherein the product dosing chamber is decreased in volume during an actuation stroke and increased in volume during recovery.

10. The foam dispensing system of claim 9, further comprising:
a product inlet valve;
a product outlet valve;
an air inlet valve; and
an air outlet valve.

11. The foam dispensing system of claim 10, wherein the product inlet valve further comprises:
an intake port in the base; and
a flange in the deformable element,
wherein the flange covers the intake port in a closed position and is separated from the intake port in an open position.

12. The foam dispensing system of claim 10, wherein the product outlet valve further comprises a slot in the deformable element.

13. The foam dispensing system of claim 10, wherein the air inlet valve further comprises a lip extending off an exterior of the deformable element.

14. The foam dispensing system of claim 10, wherein the air outlet valve further comprises an annular lip extending off an exterior of the deformable element.

15. The foam dispensing system of claim 9, wherein the air pump further comprises:
a lip extending off an exterior of the deformable element; and
an annular lip extending off an exterior of the deformable element.

16. The foam dispensing system of claim 9, wherein the deformable element further comprises:
a flange;
a slot;
a lip extending off an exterior of the deformable element; and
an annular lip extending off an exterior of the deformable element.

17. The foam dispensing system of claim 9, wherein the air pump further comprises:
a drum extending off the piston and having an interior drum wall; and
an annular lip extending off an exterior of the deformable element and seated against the interior drum wall.

18. The foam dispensing system of claim 9, wherein the air pump further comprises:
a cylinder wall extending off of the piston and having an interior cylinder wall; and
a lip extending off an exterior of the deformable element and seated against the interior cylinder wall.

19. The foam dispensing system of claim 9, wherein the air pump further comprises:
a drum extending off the piston and having an interior drum wall;
an annular lip extending off an exterior of the deformable element and seated in the drum;
a cylinder wall extending off of the piston and having an interior cylinder wall;
a lip extending off an exterior of the deformable element and seated against the interior cylinder wall; and
wherein the annular lip is unseated from the interior drum wall during the actuation stroke and is seated against the interior drum wall during recovery.

20. The foam dispensing system of claim 9, wherein the air pump further comprises:
a drum extending off the piston and having an interior drum wall;
an annular lip extending off an exterior of the deformable element and seated in the drum;
a cylinder wall extending off of the piston and having an interior cylinder wall;
a lip extending off an exterior of the deformable element and seated against the interior cylinder wall; and
wherein the lip is unseated from the interior cylinder wall during recovery and is seated against the interior cylinder wall during the actuation stroke.

* * * * *